Jan. 19, 1937. J. B. BAMBENEK ET AL 2,068,222

EMERGENCY REPAIR LINK

Filed June 6, 1936

INVENTORS
JOSEPH B. BAMBENEK
DOMINIC C. BAMBENEK
PETER WORNER
BY
ATTORNEYS

Patented Jan. 19, 1937

2,068,222

UNITED STATES PATENT OFFICE 2,068,222

EMERGENCY REPAIR LINK

Joseph B Bambenek, Dominic C. Bambenek, and Peter Worner, Winona, Minn., assignors to Peerless Chain Company, Winona, Minn., a corporation of Minnesota Application June 6, 1936, Serial No. 83,918

11 Claims. (Cl. 152—14)

This invention relates to a repair or emergency link for tire chains, and has for its principal object to provide a link of this type which will give a maximum of protection and tractive ability.

Other objects are: to provide a link which can be used to repair any type of chain; to provide a link which is especially adapted for use on chains of the twisted link type; to provide a link which cannot become detached during use; to provide a link which has elongated edgewise-acting traction elements which serve as link protecting elements, and to provide traction elements which are divergent toward the ground.

Features of the invention include all details of construction and arrangement, along with the broader ideas of means inherent in the disclosure.

Objects, features and advantages of the invention will be set forth in the description of the drawing forming a part of this application, and in said drawing.

Figure 1:
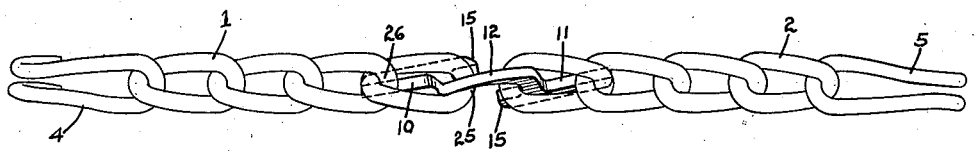
Figure 1 shows our invention applied to chain sections of a tire chain of the twisted link type, viewing the device from its tire-engaging side.

In the drawing, numerals 1 and 2 respectively indicate the chain sections connected with our device. Numerals 4 and 5 respectively indicate the terminal hooks of these sections which hooks, it will be understood, are attached to the usual elements which lie at the sides of the wheel and which space and secure the cross chains.

Figure 3:
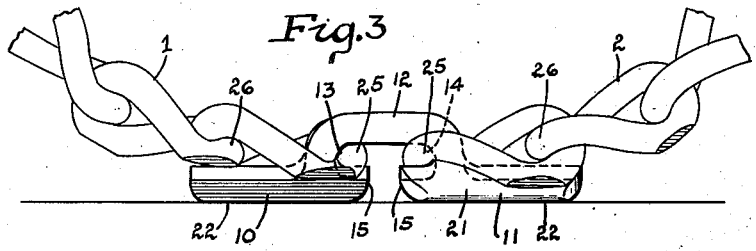
Figure 3 is a side view showing the approximate position of the device when the chain with which it is associated is attached crosswise of a tire.
Figure 4:
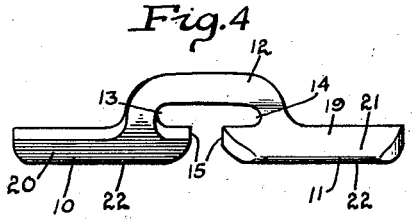
Figure 4 is a side elevation similar to Figure 3 but with the chain sections removed.
Figure 5:
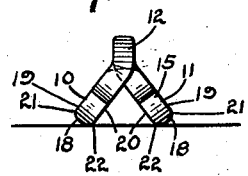
Figure 5 is an end view of Figure 4 showing the relation of the traction or digging edges to the ground.
Figure 6:
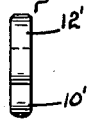
Figure 6 is an end view of a modification in which the digging elements are coplanar, that is do not diverge from one another in direction of the ground.

Referring first to Figures 4 and 5: Our repair link has a pair of ground-engaging and chain link protecting extensions respectively indicated at 10—11. These extensions are disposed to extend in a direction generally lengthwise to a chain with which the device acts as a connector. The elements extend in substantially the same direction, and means generally indicated at 12 connects the extension in a manner to form longitudinally spaced chain-receiving hooks 13—14. The ends 15 of the elements 10 and 11 are spaced apart and form part of the hook, the space between the ends 15 giving entry of the chain links to the hooks. Each extension is so constructed as to be capable of passing through a corresponding chain link to assume the hooked relation, best shown in Figures 2 and 3. When so hooked, these extensions are adapted to protectingly oppose the ground-facing surfaces of the corresponding link. As shown in Figure 5, the extensions are groundwardly divergent in opposite directions from the connecting means 12 and each extension has a rounded ground-engaging edge 18 which is of such a radius as to meet the side faces 19 and 20 of the extension to form what may be considered two longitudinal digging edges 21—22. These edges are particularly effective when the device rocks about the hooks as a center, in use. There is no intention, of course, to entirely limit the invention to this particular feature, although it is claimed along with the broader features. In the modification of Figure 6, the faces of greatest area of the extensions and of the connecting means lie in the same plane. In other words, the extensions 10' (only one of which is shown) do not diverge groundwardly.

Figure 2:
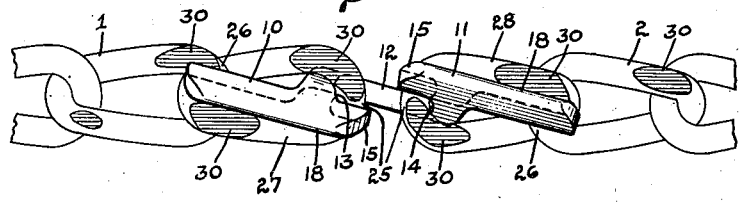
Figure 2 is a fragmentary view further illustrating the device and viewing it from its ground-engaging side, and showing the relation of its traction and protecting elements to the worn parts of a chain.

In our device, each extension is of course capable of passing through a corresponding chain link to assume the hooked relation shown, and each is adapted thereafter to project within and outside of the link, as best shown in Figures 2 and 3. This inward projection takes place particularly in a twisted link. Moreover, the extension bridges the innermost loop 25 of the terminal link and the innermost loop 26 of the next succeeding link. Each extension projects beyond the ground-engaging surface of its links, as best shown in Figure 3. When used in conjunction with a twisted link, the extension lies between the long sides of the link and bridges the loop in the manner aforementioned.

By reference to Figure 2, it will be noted that as applied to a twisted link the extension tends to lie against one long side 27 of one of the terminal links of the chain, and against the long side 28 of the other terminal link. It will be noted that the extensions are substantially parallel and that when the device is applied, these extensions lie across, or at an angle to a line passing through the longitudinal middles of the chain links.

The worn parts of the chain links are indicated at 30 to show the protecting relation of the extensions to the terminal links, and to the next succeeding links.

We believe ourselves the first to provide a device of this kind particularly adapted for use with chains of the twisted link type. Also we believe ourselves first to protect the end loops of consecutive chain links, and first to have the diggers lie within the link as well as to project outside of it.

The repair link of this invention is capable of use for repairing broken cross chains of any type, either emergency tire chains or cross chains of the Weed type. The invention is, therefore, not limited, but can be used on any type of tire cross chains.

We claim as our invention:

1. A repair link for tire chains having a pair of spaced ground-engaging and chain link protecting extensions, means connecting said extensions to form oppositely related chain-link receiving hooks, each extension being capable of passing through a corresponding chain link to assume hooked relation, and thereafter project within and outside of the end links of the chain which is being repaired.

2. A repair link for tire chains having a pair of spaced ground-engaging and chain link protecting extensions, means connecting said extensions to form oppositely related chain-link receiving hooks, each extension being capable of passing through a corresponding chain link to assume hooked relation, and thereafter lie between the end links of the chain which is being repaired and the ground, said extensions being divergent in opposite directions toward the ground, from a plane passing through the extension-connecting means and parallel with the plane of rotation of the wheel.

3. A repair link for tire chains having a pair of spaced ground-engaging and chain link protecting extensions, means connecting said extensions to form oppositely related chain-link receiving hooks, each extension being capable of passing through a corresponding chain link to assume hooked relation and thereafter longitudinally bridge the end links of the chain which is being repaired and lie between the ground facing sides of said links and the ground and projecting beyond those surfaces toward the ground.

4. A repair link for tire chains having a pair of spaced ground-engaging and chain-link protecting extensions, means connecting said extensions to form oppositely related chain-link receiving hooks, each extension being capable of passing through a corresponding chain link to assume hooked relation and thereafter lie against the ground side of the link.

5. A repair link for tire chains of the twisted link type having a pair of spaced ground-engaging and chain link protecting extensions disposed to extend in a direction generally lengthwise of the tire chain when applied thereto, means connecting said extensions to form oppositely related longitudinally spaced chain-link receiving hooks, each extension being capable of passing through a corresponding chain link to assume hooked relation and thereafter lie between the ground side of the link and the ground, and protectingly bridge the innermost end loop of that link and the innermost end loop of the next succeeding link.

6. A repair link having a pair of spaced ground-engaging and chain link protecting extensions, means connecting said extensions to form opposingly related chain-link receiving hooks, each extension being capable of passing through a corresponding chain-link to assume hooked relation and thereafter protectingly oppose the ground-facing surfaces of that link, said extensions being divergent in opposite directions from said connecting means toward the ground.

7. A repair link having a pair of spaced ground-engaging and chain link protecting extensions, means connecting said extensions to form opposingly related chain-receiving hooks, each extension being capable of passing through a corresponding chain link to assume hooked relation and thereafter protectingly oppose the ground-facing surfaces of that link, said extensions being divergent in opposite directions from said connecting means toward the ground and each extension having a ground-engaging edge.

8. A repair link for tire chains having a pair of ground-engaging and chain link protecting extensions, arranged to extend in a direction generally lengthwise of the tire chain when applied thereto, means connecting said extensions to form opposingly related longitudinally spaced chain link receiving hooks, each extension being capable of passing through a corresponding chain link to assume hooked relation and thereafter protectingly oppose or be engaged with the ground-facing surface of a corresponding chain link as well as with the end loop of the next succeeding chain link, said extensions being divergent in opposite directions from said connecting means toward the ground.

9. An emergency repair link having means respectively connectable with corresponding end-links of the chain elements which are to be repaired, said repair link having extensions which are so disposed and constructed as to be protectingly interposed between said end links and the road when the repair link is in use.

10. An emergency repair link having means which are respectively connectable with corresponding end links of the chain elements which are to be repaired, said repair link having extensions which are so disposed and constructed as to be protectingly interposed between said end links and the road when the repair link is in use, the overall length of the repair link as measured from the outer ends of said extensions being substantially equal to the length of the three links of the chain which is being repaired.

11. An emergency repair link having means which are respectively connectable with corresponding end links of the chain elements which are to be repaired, said repair link having extensions which are so disposed and constructed as to be protectingly interposed between said end links and the road when the repair link is in use, said extensions being substantially parallel, and diagonally arranged relatively to a line passing lengthwise of the links.

JOSEPH B. BAMBENEK.
DOMINIC C. BAMBENEK.
PETER WORNER.